United States Patent [19]

Sloma

[11] 4,281,735
[45] Aug. 4, 1981

[54] APPARATUS AND METHOD FOR CONVERTING A FULL-TIME FOUR-WHEEL DRIVE TRANSFER CASE FOR PART-TIME OPERATION

[76] Inventor: Greg T. Sloma, 1206 S. 116th Ave., Omaha, Nebr. 68144

[21] Appl. No.: 79,071

[22] Filed: Sep. 26, 1979

[51] Int. Cl.³ .............................................. B60K 17/34
[52] U.S. Cl. ..................................... 180/247; 180/250
[58] Field of Search ................ 180/247, 248, 249, 250

[56] References Cited

U.S. PATENT DOCUMENTS

| | | | |
|---|---|---|---|
| 2,228,581 | 1/1941 | Olen | 180/250 |
| 2,329,916 | 9/1943 | Lamb | 180/247 |
| 3,650,349 | 3/1972 | Cleveland | 180/249 |
| 3,848,691 | 11/1974 | Dolan | 180/250 |
| 4,037,429 | 7/1977 | Britzius | 180/233 |

*Primary Examiner*—John P. Silverstrim
*Attorney, Agent, or Firm*—Zarley, McKee, Thomte, Voorhees & Sease

[57] ABSTRACT

A method for converting a full-time four-wheel drive transfer case for part-time four-wheel drive operation includes substituting an output shaft having a radially extended mounting flange at the forward end thereof. The original output shaft has a rear wheel drive gear secured thereon for engagement with the spider gears of a differential assembly, the spider housing of which is mounted on the transfer case input shaft for rotation therewith. The mounting flange of the substitute output shaft is adapted for connection to the rearward end of the spider housing upon removal of the spider gears from the differential assembly thereby to connect the substitute output shaft to the input shaft for rotation in unison. With the spider gears removed, the front wheel drive mechanism is selectively actuated by the sliding lock clutch on the input shaft, the spider housing and lock clutch including coacting gears which are meshed when the clutch is engaged. A spacer ring may be interposed between the sliding lock clutch and differential cross to maintain the axially spaced relation therebetween. The method of the invention includes the steps of removing the spider gears from the transfer case and securing the output shaft to the differential housing, thereby connecting the input and output shafts for rotation in unison.

5 Claims, 9 Drawing Figures

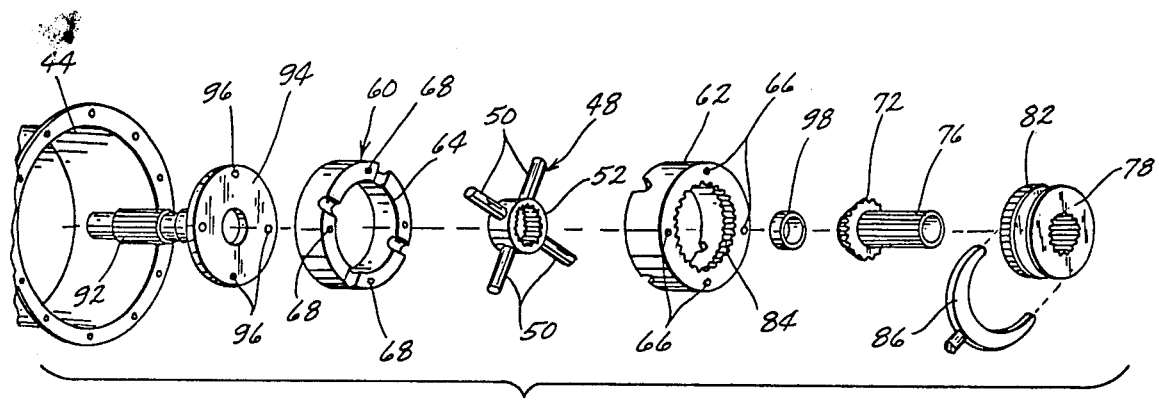
FIG. 6
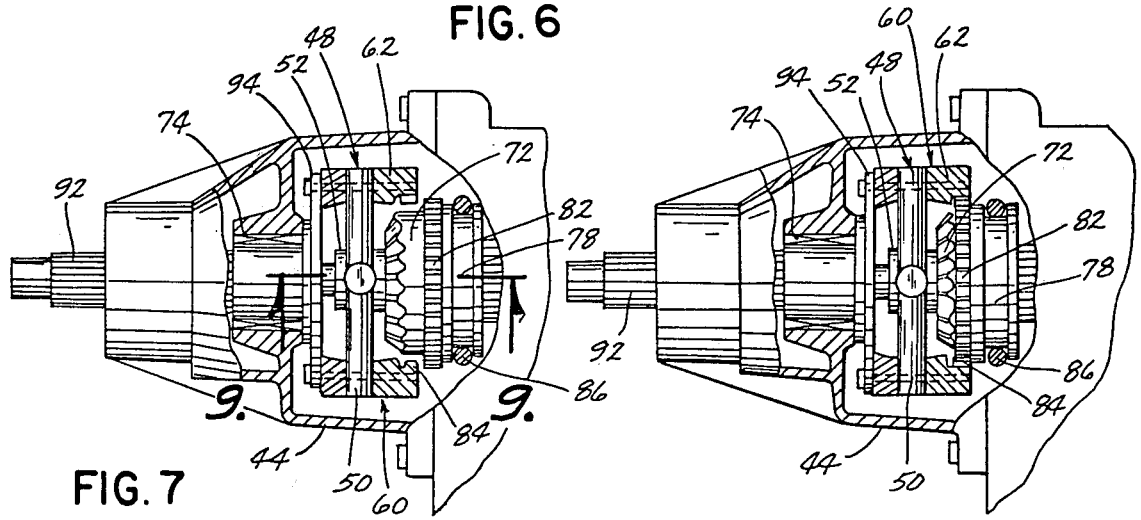
FIG. 7
FIG. 8
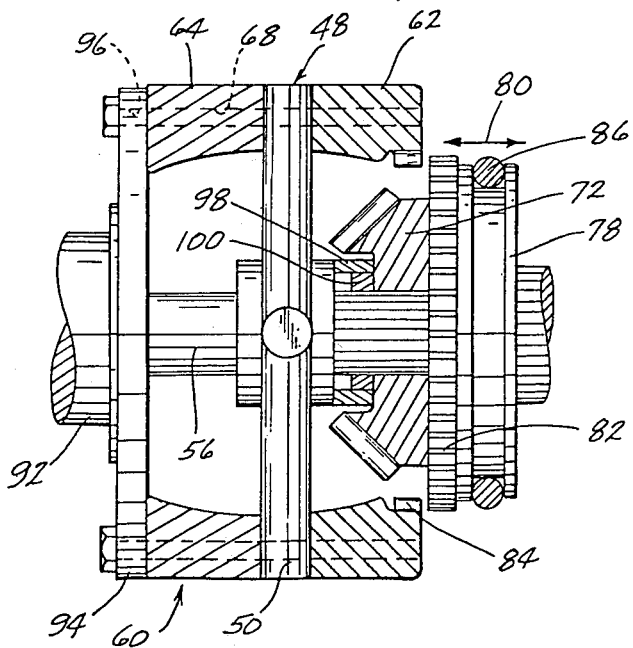
FIG. 9

APPARATUS AND METHOD FOR CONVERTING A FULL-TIME FOUR-WHEEL DRIVE TRANSFER CASE FOR PART-TIME OPERATION

BACKGROUND OF THE INVENTION

The present invention is directed generally to transfer cases for four-wheel drive automotive vehicles and more particularly to an apparatus and method for converting a full-time four-wheel drive transfer case for part-time four-wheel drive operation.

Prior to approximately 1974, most four-wheel drive vehicles were equipped the same. The front drive mechanism of the four-wheel drive vehicles consisted of a rigid front axle housing which was quite similar to the rear axle housing manufactured by American automakers. A U-joint or knuckle at both ends of the axle housing allowed the wheels to turn left and right. Attached to each knuckle was a hub to which the wheel was bolted and a wheel bearing protruded externally through the wheel. At the very tip of each end of the axle was a mechanism known as a "lock-out" hub. This lock-out could be positioned in either a locked or free position. In the free position, the wheel and hub rotated independently of the axle which is located inside the axle housing. In the locked position, the wheel and hub were secured to the axle which in turn was connected to the differential located in the center of the axle housing. The differential was connected to the front drive shaft which in turn was connected to the transfer case.

The transfer case was connected directly behind the transmission for selectively transferring power from the engine and transmission to the rear drive shaft and the front drive shaft. The transfer cases were known as part-time transfer cases. In the two-wheel mode, and with the lock-outs in the free position, the vehicle would function as a normal two-wheel drive vehicle with all power being transferred to the rear drive shaft which in turn drove the rear axle and rear wheels. The front drive shaft, differential and axle would not move and would be in a stationary position. With the transfer case in the four-wheel mode and the lock-outs in the locked position, the front drive shaft, differential and axle would also pull the vehicle.

That type of four-wheel drive vehicle, with lock-outs and part-time transfer case, provided two major benefits. First, it was economical in that power and gasoline were not wasted in turning the front drive shaft, differential and axle when the extra traction of the front wheels was not needed. Secondly, wear and tear on the front driving parts was also minimized. The result was that the driver could use four-wheel drive when it was needed and turn off the front drive system when the rear wheels provided sufficient traction.

Sometime in 1974, however, the major American automakers introduced an entirely new system which used a full-time transfer case. In most cases, this transfer case is built by New Process Gear Division, a division of Chrysler Corporation. The New Process Model 203 full-time transfer case, for example, is a very elaborate mechanism. In addition to the typical gear system which provides a high and low range, the transfer case consists of a middle section which houses a large chain for driving the front drive shaft and a rear section which contains a compensating differential.

The differential works well in situations where all four tires of the vehicle have exactly the same amount of traction. However, when one wheel has less traction, for instance when one wheel is on ice and the other three are on dirt, the differential directs all of the power of the vehicle to the wheel on ice. This, of course, results in a loss of traction and movement. For the same reason, a vehicle equipped with a full-time four-wheel drive transfer case will not function with lock-outs on the front axle.

In order to compensate for this situation, the full-time transfer case is equipped with a locking mechanism which will lock out the differential and force both the front and rear drive shafts to move at the same speed. This, in essence, will guarantee that at least one wheel on each axle is rotated. In any event, whether the locking mechanism is engaged or not, the vehicle is in full-time four-wheel drive which necessarily results in increased wear and tear and decreased gas mileage.

Accordingly, a primary object of the invention is to provide an apparatus and method for converting a full-time four-wheel drive transfer case for selective part-time wheel drive and four-wheel drive operation.

Another object is to provide such an apparatus and method which will conserve fuel by permitting the front drive shaft, differential and axle of a vehicle to remain idle when the extra traction of the front wheels is not needed.

Another object is to provide such an apparatus and method which will minimize wear and tear on the front drive system of a vehicle by permitting the same to be disengaged at times.

Another object of the invention is to provide such an apparatus and method which involve a simple elimination and substitution of a minimum number of original parts.

Another object is to provide such an apparatus and method which is effective to convert a full-time transfer case so that it will operate like a part-time transfer case described hereinabove.

Another object is to provide an apparatus for converting a full-time transfer case for part-time operation, which apparatus is simple and rugged in construction and efficient in operation.

Finally, another object is to provide a method for converting a full-time transfer case for part-time operation, which method may be simply, quickly and easily performed.

SUMMARY OF THE INVENTION

The apparatus of the present invention will convert a full-time four-wheel drive transfer case for selective part-time two-wheel drive and four-wheel drive operation. The apparatus includes a mounting flange for connecting the rearward output shaft of the transfer case directly to the differential spider housing which in turn, is mounted for rotation with the input shaft of the transfer case. Accordingly, the input and output shafts are connected for rotation in unison, thereby establishing a full-time drive train to the rear wheels of the vehicle. Power may be selectively directed to the front wheel drive train simply by operating the conventional locking mechanism of the original full-time transfer case. With the securement of the output shaft to the differential spider housing, however, it is necessary to remove the spider gears which engage the front wheel drive gear on the input shaft. Upon conversion of the transfer case according to the present invention, power is alternatively directed to the front wheel drive train by the engagement of coacting gears on the spider housing and sliding lock clutch of the transfer case locking mechanism. Accordingly, a full-time transfer case including the conversion apparatus of the present invention may be selectively engaged in either a two-wheel drive mode or four-wheel drive mode by operation of the locking mechanism including with the original full-time transfer case. A spacer ring may be interposed on the input shaft between the differential and front wheel drive gear to prevent interference therebetween in the two-wheel mode operation of the transfer case.

It will be apparent that the method of the present invention thus includes disconnecting the output shaft and differential assembly from the input shaft of the transfer case, removing the spider gears from the cross of the differential assembly and securing a rearward output shaft to the differential spider housing, thereby to connect the input and output shafts for rotation in unison. The method may further include substituting for the original output shaft a modified output shaft having a radially extended flange thereon and connecting the flange to the spider housing.

BRIEF DESCRIPTION OF THE DRAWINGS

FIG. 6 is an exploded perspective view, similar to FIG. 5, including the conversion according to the present invention;

FIG. 7 is an enlarged partially sectional side view of the converted transfer case as set up for two-wheel drive operation;

FIG. 8 is an enlarged partially sectional side view of the converted transfer case as set up for four-wheel drive operation; and FIG. 9 is an enlarged partially sectional side detail view of the transfer case differential as converted according to the present invention.

DESCRIPTION OF THE PREFERRED EMBODIMENT

Figures 1, 2:
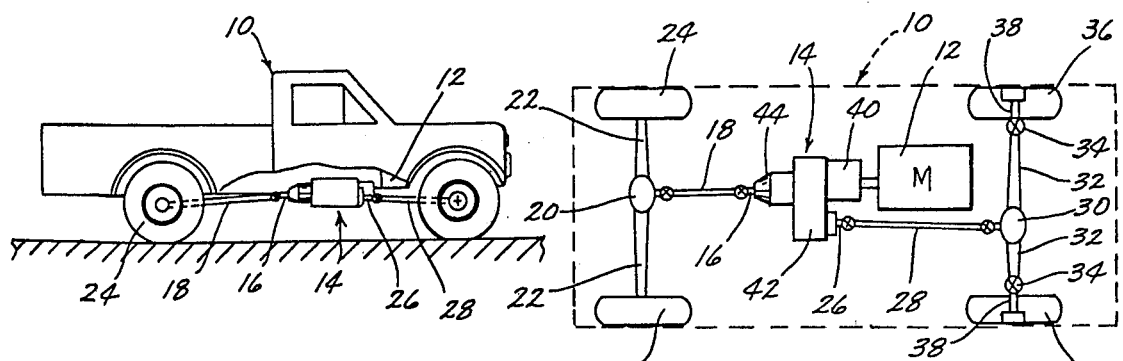
FIG. 1 is a side elevational view of a four-wheel drive automotive vehicle with portions broken away to show the transfer case thereof.
FIG. 2 is an enlarged top plan view of the four-wheel drive train for the vehicle of FIG. 1.

A conventional four-wheel drive automotive vehicle in the form of a pickup truck 10 is shown in FIGS. 1 and 2 as including a motor and transmission assembly 12 drivingly connected to a full-time four-wheel drive transfer case 14. A rearward output shaft 16 at the rearward end of the transfer case is connected by a rear wheel drive shaft 18 which in turn is connected to the differential 20, rear axle 22 and rear wheels 24. The transfer case 14 additionally includes a forward output shaft 26 which is connected to a front wheel drive shaft 28 which in turn is connected to the differential 30 and front axle 32.

The front axle 32 includes a pivotal U-joint or knuckle 34 t each end thereof which allows the front wheels 36 to turn right and left. The wheels are bolted to pivotal spindles 38 attached to the knuckles 34.

Figures 3, 4:
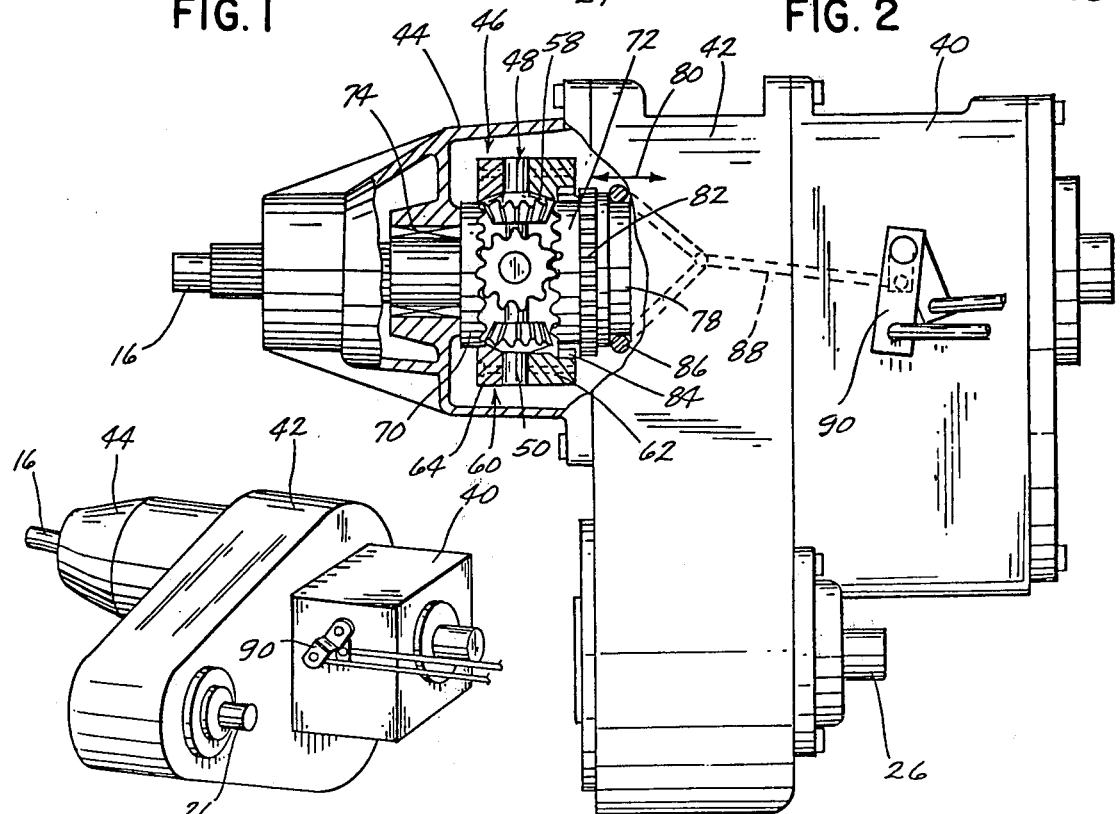
FIG. 3 is a further enlarged perspective view of a full-time four-wheel drive transfer case.
FIG. 4 is a further enlarged partially sectional side view of the full-time transfer case as originally equipped.
Figure 5:
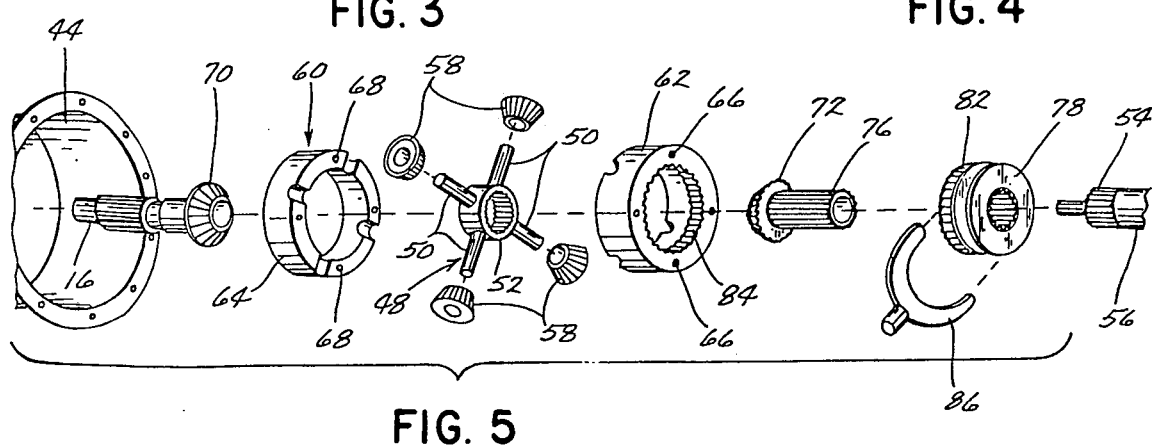
FIG. 5 is an exploded perspective view of parts of the compensating differential of the transfer case of FIG. 4.

Referring to FIGS. 3-5, the conventional full-time four-wheel drive transfer case 14 is shown. This unit is commercially availabe as New Process Transfer Case Model 203, for example, which is manufactured by the New Process Gear Division of Chrysler Corporation. This is an elaborate mechanism which includes a forward housing 40 including a typical gear system which provides a high and low range, a middle housing 42 which includes a large chain for driving the forward output shaft 26, and a rear housing 44 which contains a compensating differential indicated generally at 46.

The compensating differential 46 includes a cross 48 having four legs 50 extended radially outwardly from an internally splined collar 52 which is adapted to be mounted on a coacting splined portion 54 of a forward input shaft 56 extended rearwardly from the middle housing 42. Cross 48 rotatably carries four spider gears 58, the heart of any differential, and is surrounded by and enclosed within an annular spider housing 60 including front and rear sections 62 and 64 respectively interconnected by bolts through holes 66 and 68. Note that the spider housing 60 is thus mounted for rotation in unison with the forward input shaft 56.

Drivingly connected to the compensating differential 46 are the rear wheel drive gear 70 and front wheel drive gear 72. The rear wheel drive gear 70 is secured to the forward end of output shaft 16 which is rotatably supported within the rear housing 44 by bearing 74. The front wheel drive gear 72 is rotatably supported on the input shaft 56 and includes a forward extension 76 within the middle housing 42 for driving the large chain (not shown) to turn the forward output shaft 26. A sliding lock clutch 78 is internally splined so as to be slidably mounted on the forward extension 76 of front wheel drive gear 72. Clutch 78 is axially slidable relative to the input shaft 56 as indicated by arrow 80 in FIG. 4 between the forward disengaged position shown and a rearward engaged position. Note that the clutch 78 and spider housing 60 are provided with coacting gears 82 and 84 which are moved into engagement when the clutch is positioned in its rearward engaged position. The clutch 78 is part of the locking mechanism of the transfer case as described above in the Background section. When engaged, clutch 78 is operative to fix the spider gears 58 relative to the spider housing 60, thereby locking out the differential and causing the rear and front wheel drive gears 70 and 72 to rotate at the same speed.

To axially move the clutch 78, a lock-out shift fork 86 circumferentially engages clutch 78 and is connected by a linkage 88 to a lock-out shifter 90.

It is to be understood that the entire transfer case 14 as thus far described is conventional and operates as follows. Since the cross 48 is mounted on the input shaft 56, the spider housing 60 is rotating at all times when the vehicle is in motion. The rearward output shaft 16 of the transfer case mates to the rear side of the four spider gears 58 and the front wheel drive gear 72 mates to the front side of the spider gears. Accordingly, the rear output shaft may be standing still if the differential is directing the power to the front drive shaft and the front wheels have less traction. The converse may be true if the rear wheels have less traction. The conversion apparatus and method of the present invention resolves this problem and additionally afford an optional two-wheel drive capability for the vehicle.

Referring to FIGS. 6-9, the conversion apparatus of the present invention includes a substitute output shaft 92 which is similar to the original output shaft 16 except that the rear wheel drive gear 70 has been replaced by a circular mounting plate 94. Plate 94 has circumferentially spaced-apart holes 96 adapted for registration with the holes 68 of the spider housing 60 so that the mounting plate may be rigidly secured to the rearward side of the spider housing. Since the spider housing is fixed for rotation with the input shaft 56, the substitute output shaft 92 thus is coupled to the input shaft 56 for a full-time transfer of power directly to the rear wheel drive shaft 18.

The conversion system of the present invention further contemplates removing the spider gears 58 from the cross 48 and thereby eliminating any drive connection to the front wheel drive gear 72. Optional power transfer to the front wheels however is provided by the sliding lock clutch 78.

Referring to FIG. 7, wherein clutch 78 is shown in its forward disengaged position, there is no connection between the rotating spider housing 60 and either the front wheel drive gear 72 or clutch 78. When clutch 78 is moved rearwardly to its engaged position as shown in FIG. 8, however, the coacting gears 82 and 84 afford a direct drive connection between the spider housing 60 and clutch 78 for a transfer of power to the forward extension 76 of the front wheel drive gear 72 which is operative to drive the front wheels 36.

In FIG. 9, the present invention further contemplates the insertion of a spacer ring 98 between the cross 48 and front wheel drive gear 72 to maintain the cross and front wheel drive gear in axially spaced relation and thereby prevent interference between them when the transfer case is in the two-wheel drive mode as shown in FIG. 9. Spacer ring 98 has a sufficient inside diameter so as to fit over an existing spacer member 100 originally provided with the full-time transfer case 14.

In operation, the transfer case 14 functions as follows when equipped with the conversion apparatus of the present invention. Since the rear output shaft 92 is now permanently connected to the main input shaft 56 of the transfer case, the vehicle is in permanent two-wheel drive with no way of disconnecting the power to the rear drive shaft 18. In order to engage the front drive shaft 28, all that is necessary is that the transfer case be put into the locked position by operation of the conventional lock-out shifter 90. Prior to installing the conversion apparatus of the invention, the locked position was used to lock out the compensating differential 46 and force the front and rear drive shafts 28 and 18 to turn at the same speed. But with the substitute output shaft 92 of the present invention permanently attached to the spider housing 60 and thus to the input shaft 56, the sliding lock clutch 78 works as a coupling to selectively connect the forward output shaft 26 to the spider housing 60 when desired.

Note that in order to obtain the benefits of increased gas mileage and decrease in wear and tear of the front wheel drive train, lock-outs must be installed on the front axle. Otherwise, the rotation of the front wheels on the road surface would operate to rotate the front wheel drive train even when the sliding lock clutch 78 is in its forward disengaged position. The front lock-outs are not a part of the invention and are currently commercially available from truck parts distributors.

An important feature of the present invention is the connection of the rear output shaft of the transfer case to the spider housing for rotation in unison. Whereas this is accomplished in the preferred embodiment by the provision of a substitute output shaft having a mounting plate fixed on one end thereof, it is contemplated that such a connection may be otherwise accomplished by a mounting flange adapted for securement to the forward end of the original output shaft 16 to form a rigid assembly therewith, with the mounting flange being adapted for connection to the spider housing.

It will be apparent that the method of the present invention for converting a full-time four-wheel transfer case for part-time operation thus includes disconnecting the output shaft 16 and differential assembly 46 from said input shaft 56, removing the spider gears 58 from the cross 48, and securing a rearward output shaft to the annular spider housing 60 so as to connect the input and output shafts for rotation in unison. Securing a rearward output shaft to the annular spider housing may include substituting a modified output shaft having a radially extended flange means on its forward end and connecting the flange means to the spider housing. The method further contemplates interposing a spacer ring between the cross and front wheel drive gear.

Thus there has been shown and described a full-time to part-time four-wheel drive transfer case conversion apparatus and method which accomplish at least all of the stated objects.

I claim:

1. A method of converting a full-time four-wheel drive transfer case for part-time four-wheel drive operation wherein said transfer case includes a housing, forward input shaft rotatably supported within said housing and having a front wheel drive gear rotatably supported thereon, a rearward output shaft rotatably supported in said housing and having a rear wheel drive gear secured thereon, a differential assembly interconnecting said input and output shafts and including a cross mounted on a rearward portion of said input shaft for rotation therewith, a plurality of spider gears rotatably carried on said cross and disposed in engagement with said front and rear wheel drive gears, and an annular spider housing surrounding said cross and secured thereto for rotation therewith, a sliding lock clutch slidable on said input shaft and connected to said front wheel drive gear for rotation therewith, said spider housing and sliding lock clutch including coacting gear means which are selectively engageable and disengageable in response to sliding movement of said lock clutch to respectively couple and uncouple said front wheel drive gear and spider housing, said method comprising the steps of removing said rearward output shaft and spider gears, connecting a substitute rearward output shaft means to said annular spider housing for full-time rotation in unison, whereby said coacting gear means of said spider housing and sliding lock clutch are engageable and disengageable in response to sliding movement of said lock clutch to selectively connect said front wheel drive gear to said spider housing for part-time four-wheel drive operation.

2. A method for converting a full-time four-wheel drive transfer case for part-time four-wheel drive operation wherein said transfer case includes a housing, forward input shaft rotatably supported within said housing and having a front wheel drive gear rotatably supported thereon, a rearward output shaft rotatably supported in said housing and having a rear wheel drive gear secured thereon, a differential assembly interconnecting said input and output shafts and including a cross mounted on a rearward portion of said input shaft for rotation therewith, a plurality of spider gears rotatably carried on said cross and disposed in engagement with said front and rear wheel drive gears, and an annular spider housing surrounding said cross and secured thereto for rotation therewith, a sliding lock clutch slidable on said input shaft and connected to said front wheel drive gear for rotation therewith, said spider housing and sliding lock clutch including coacting gear means which are selectively engageable and disengageable in response to sliding movement of said lock clutch to respectively couple and uncouple said front wheel drive gear and spider housing, said method comprising the steps of
  disconnecting said output shaft and differential assembly from said input shaft,
  removing said spider gears from the cross,
  reconnecting said cross and annular spider housing to said input shaft, and
  securing a substitute rearward output shaft to said annular spider housing, thereby connecting the input and output shafts for full-time rotation in unison, whereby said sliding lock clutch is thereby operable to selectively connect said front wheel drive gear to said input shaft for part-time four-wheel drive operation.

3. The method of claim 2 wherein said substitute rearward output shaft includes a radially extended flange means on the forward end thereof, and securing said substitute rearward output shaft comprises connecting said flange means to said annular spider housing.

4. The method of claim 3 further comprising interposing a spacer ring on said input shaft between the front wheel drive gear and cross thereby axially separating the front wheel drive gear and cross and preventing interference therebetween during two-wheel drive operation of the transfer case.

5. The method of claim 4 further comprising disassembling said housing for obtaining access to said output shaft and differential assembly and reassembling said housing for rotatably supporting said substitute rearward output shaft after connecting said flange means to said annular spider housing.

* * * * *